(12) United States Patent
Fitzgibbon (10) Patent No.: US 9,143,009 B2
(45) Date of Patent: Sep. 22, 2015

(54) METHOD AND APPARATUS TO FACILITATE PROVIDING POWER TO REMOTE PERIPHERAL DEVICES FOR USE WITH A MOVABLE BARRIER OPERATOR SYSTEM

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 2020 days.

(21) Appl. No.: 11/670,221

(22) Filed: Feb. 1, 2007

(65) Prior Publication Data

US 2008/0186129 A1 Aug. 7, 2008

(51) Int. Cl.
*H04B 7/00* (2006.01)
*H02J 17/00* (2006.01)
*G07C 9/00* (2006.01)

(52) U.S. Cl.
CPC ....... *H02J 17/00* (2013.01); *G07C 2009/00603* (2013.01)

(58) Field of Classification Search
USPC .......................................... 340/5.2; 455/522
See application file for complete search history.

(56) References Cited

U.S. PATENT DOCUMENTS

| | | | |
|---|---|---|---|
| 645,576 A | | 3/1900 | Telsa |
| 5,146,153 A | * | 9/1992 | Luchaco et al. ............... 323/324 |
| 5,237,264 A | * | 8/1993 | Moseley et al. ............... 323/324 |
| 5,572,829 A | * | 11/1996 | Stoltenberg ....................... 49/200 |
| 6,084,317 A | | 7/2000 | Wolfe et al. |
| 6,289,237 B1 | * | 9/2001 | Mickle et al. .................. 600/509 |
| 6,323,775 B1 | * | 11/2001 | Hansson ..................... 340/636.1 |
| 6,415,388 B1 | * | 7/2002 | Browning et al. ............. 713/322 |
| 6,429,622 B1 | * | 8/2002 | Svensson ....................... 320/106 |
| 6,437,685 B2 | * | 8/2002 | Hanaki ...................... 340/286.02 |
| 6,439,009 B1 | * | 8/2002 | Heese et al. ......................... 70/92 |
| 6,462,432 B1 | * | 10/2002 | Seelig et al. ...................... 307/33 |
| 6,486,795 B1 | * | 11/2002 | Sobel et al. .............. 340/825.72 |
| 6,496,498 B1 | * | 12/2002 | Kockmann et al. ........... 370/347 |
| 6,560,123 B1 | * | 5/2003 | de Varennes et al. ......... 361/807 |
| 6,588,153 B1 | * | 7/2003 | Kowalczyk ....................... 49/380 |
| 6,636,146 B1 | * | 10/2003 | Wehoski ....................... 340/10.4 |
| 6,665,983 B1 | * | 12/2003 | Zimmerman et al. .......... 49/449 |
| 6,700,310 B2 | * | 3/2004 | Maue et al. .................... 310/339 |

(Continued)

FOREIGN PATENT DOCUMENTS

DE 3612761 10/1987

OTHER PUBLICATIONS

British Search Report Under Section 17 issue on May 27, 2008 in GB0801409.4.

(Continued)

*Primary Examiner* — Hai V Nguyen
(74) *Attorney, Agent, or Firm* — Fitch Even Tabin & Flannery LLP (57) ABSTRACT

Operating power (207 and/or 209) is wirelessly transmitted (101) within a movable barrier operator system (200) to at least one remote peripheral device (204) to thereby provide at least a portion of the remote peripheral device's instantaneous power consumption requirements. By these teachings, this remote peripheral device and the movable barrier operator for the movable barrier operator system are able to transmit information there between separate and apart from such wireless transmission of operating power. Such an exchange might comprise, for example, one or more separate wireless transmissions that are distinct and separate from the wireless power transmissions.

62 Claims, 4 Drawing Sheets

(56) References Cited

U.S. PATENT DOCUMENTS

| | | | |
|---|---|---|---|
| 6,703,962 B1* | 3/2004 | Marics et al. | 341/176 |
| 6,704,608 B1* | 3/2004 | Azuma | 700/66 |
| 6,732,476 B2* | 5/2004 | Mehalshick et al. | 49/506 |
| 7,002,312 B2* | 2/2006 | Wojciak, Jr. | 318/452 |
| 7,057,547 B2* | 6/2006 | Olmsted et al. | 341/176 |
| 7,061,197 B1* | 6/2006 | Mullet et al. | 318/466 |
| 7,065,658 B1* | 6/2006 | Baraban et al. | 713/300 |
| 7,068,991 B2* | 6/2006 | Parise | 455/343.1 |
| 7,088,999 B2* | 8/2006 | Shih et al. | 455/423 |
| 7,173,516 B2* | 2/2007 | Mullet et al. | 340/5.71 |
| 7,187,299 B2* | 3/2007 | Kunerth et al. | 340/870.05 |
| 7,211,975 B2* | 5/2007 | Murray et al. | 318/286 |
| 7,224,275 B2* | 5/2007 | Fitzgibbon | 340/539.26 |
| 7,239,894 B2* | 7/2007 | Corbett et al. | 455/562.1 |
| 7,243,174 B2* | 7/2007 | Sheahan et al. | 710/72 |
| 7,266,344 B2* | 9/2007 | Rodriguez | 455/41.3 |
| 7,282,883 B2* | 10/2007 | Mullet et al. | 318/600 |
| 7,289,014 B2* | 10/2007 | Mullet et al. | 340/5.7 |
| 7,310,043 B2* | 12/2007 | Mamaloukas | 340/5.61 |
| 7,315,143 B2* | 1/2008 | Mullet et al. | 318/280 |
| 7,327,107 B2* | 2/2008 | Mullet et al. | 318/280 |
| 7,327,108 B2* | 2/2008 | Mullet et al. | 318/280 |
| 7,327,249 B1* | 2/2008 | Murray | 340/521 |
| 7,382,063 B2* | 6/2008 | Mullet et al. | 307/64 |
| 7,521,881 B2* | 4/2009 | VanDrunen et al. | 318/66 |
| 7,573,431 B2* | 8/2009 | Parsche | 343/788 |
| 7,576,504 B2* | 8/2009 | Mullet et al. | 318/445 |
| 7,576,631 B1* | 8/2009 | Bingle et al. | 340/5.54 |
| 7,589,615 B2* | 9/2009 | Keller et al. | 340/5.64 |
| 7,635,960 B2* | 12/2009 | Mullet et al. | 318/280 |
| 7,805,977 B2* | 10/2010 | Study | 73/12.01 |
| 7,816,875 B2* | 10/2010 | Taheri et al. | 318/253 |
| 7,825,804 B2* | 11/2010 | Malik | 340/572.1 |
| 2002/0181189 A1* | 12/2002 | Yang | 361/681 |
| 2003/0150164 A1* | 8/2003 | Mehalshick et al. | 49/26 |
| 2004/0137983 A1* | 7/2004 | Kerr et al. | 463/29 |
| 2004/0142733 A1* | 7/2004 | Parise | 455/572 |
| 2004/0239496 A1* | 12/2004 | Fitzgibbon | 340/539.1 |
| 2005/0134426 A1* | 6/2005 | Mullet et al. | 340/5.7 |
| 2005/0176400 A1* | 8/2005 | Mullet et al. | 455/403 |
| 2005/0195066 A1* | 9/2005 | Vandrunen et al. | 340/5.7 |
| 2006/0058013 A1* | 3/2006 | Bocking et al. | 455/418 |
| 2006/0077035 A1* | 4/2006 | Mamaloukas | 340/5.61 |
| 2006/0132284 A1* | 6/2006 | Murphy et al. | 340/5.7 |
| 2006/0267409 A1* | 11/2006 | Mullet et al. | 307/64 |
| 2007/0007968 A1* | 1/2007 | Mauney et al. | 324/538 |
| 2007/0010295 A1* | 1/2007 | Greene et al. | 455/572 |
| 2007/0046231 A1* | 3/2007 | Mullet et al. | 318/280 |
| 2007/0046428 A1* | 3/2007 | Mamaloukas et al. | 340/5.61 |
| 2007/0057809 A1* | 3/2007 | Su | 340/825.69 |
| 2007/0063815 A1* | 3/2007 | Tsui et al. | 340/5.71 |
| 2007/0118335 A1* | 5/2007 | Andarawis et al. | 702/188 |
| 2007/0149162 A1* | 6/2007 | Greene et al. | 455/343.1 |
| 2007/0178945 A1* | 8/2007 | Cook et al. | 455/572 |
| 2007/0188120 A1* | 8/2007 | Mullet et al. | 318/280 |
| 2007/0224936 A1* | 9/2007 | Desai | 455/41.2 |
| 2007/0229218 A1* | 10/2007 | Nassimi | 340/5.61 |
| 2007/0229264 A1* | 10/2007 | Eveland | 340/572.1 |
| 2007/0290881 A1* | 12/2007 | Nikitin et al. | 340/825.69 |
| 2008/0014897 A1* | 1/2008 | Cook et al. | 455/343.1 |
| 2008/0094172 A1* | 4/2008 | Roosli et al. | 340/5.6 |
| 2008/0094245 A1* | 4/2008 | Hardacker et al. | 340/825.22 |
| 2008/0132220 A1* | 6/2008 | Fitzgibbon | 455/420 |
| 2008/0188181 A1* | 8/2008 | Choi et al. | 455/41.2 |
| 2008/0275312 A1* | 11/2008 | Mosesov et al. | 600/300 |
| 2009/0102296 A1* | 4/2009 | Greene et al. | 307/149 |
| 2009/0286476 A1* | 11/2009 | Toncich et al. | 455/41.1 |

OTHER PUBLICATIONS

Examination Report Under Section 18(3) issued from British Application No. GB0801409.4 Dated Feb. 22, 2011.

* cited by examiner

METHOD AND APPARATUS TO FACILITATE PROVIDING POWER TO REMOTE PERIPHERAL DEVICES FOR USE WITH A MOVABLE BARRIER OPERATOR SYSTEM

TECHNICAL FIELD

This invention relates generally to movable barrier operator systems and more particularly to the provision of operating electrical power to remote peripheral devices as comprise a part of such movable barrier operator systems.

BACKGROUND

Movable barrier operator systems of various kinds are known in the art. Some systems provide automated (and/or remote) control with respect to movement of a movable barrier (such as, but not limited to, a single-piece or segmented garage door, a sliding or pivoting gate, a pivoting guard arm, rolling shutters, and the like). Such control systems generally serve to provide some point of control with respect to a mechanism that itself governs, in some fashion, access to some further destination (such as, but not limited to, a garage or other parking area, a business area, a recreation or exercise area, and so forth).

Such systems often include a movable barrier operator that facilitates such control. In addition, in many cases, such systems also include one or more remote peripheral devices. Examples include, but are not limited to, wall-mounted remote actuation switches, so-called keyless entry interfaces, biometric entry interfaces, one or more obstacle detectors (including, but not limited to, contact based as well as light beam based detectors), auxiliary lighting, and so forth. In most cases, such remote peripheral devices either have an internal discrete portable power source (such as one or more batteries) and/or are dependent upon an external source of power.

In the case of the latter, such remote peripheral devices are usually coupled to the aforementioned movable barrier operator (via, for example, electrical conductors such as wire or cable). In this case, in many instances, these electrical conductors also serve to convey information between such components. To illustrate, a pair of conductive wires often serve to both provide power from a movable barrier operator to an obstacle detector and to serve as a bearer medium by which the obstacle detector can provide obstacle detection information to the movable barrier operator.

Such an approach serves well for many application purposes. There are instances and application settings, however, when such an approach leaves something to be desired. In some cases, providing such electrical conductors can comprise a time-consuming task and/or may present esthetic concerns regarding appearance of the installed system.

BRIEF DESCRIPTION OF THE DRAWINGS

The above needs are at least partially met through provision of the method and apparatus to facilitate providing power to remote peripheral devices for use with a movable barrier operator system described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, operating power is wirelessly transmitted within a movable barrier operator system to at least one remote peripheral device to thereby provide at least a portion of the remote peripheral device's instantaneous power consumption requirements. By these teachings, this remote peripheral device and the movable barrier operator for the movable barrier operator system are able to transmit information therebetween separate and apart from such wireless transmission of operating power. Such an exchange might comprise, for example, one or more separate wireless transmissions that are distinct and separate from the wireless power transmissions.

By one approach, the amount of power so transmitted can be varied (as a function, for example, of an operating state of a movable barrier as is controlled by the movable barrier operator system, a power request as is transmitted by the remote peripheral device, or the like). These teachings will also readily accommodate using one, or a plurality, of transmission antennas to facilitate the making of such power transmissions. By one approach this antenna (or antennas) can comprise an omni-directional transmission antenna. By another approach, alone or in combination with the use of one or more omni-directional transmission antennas, this antenna (or antennas) can comprise a directional transmission antenna.

These and other variations are readily accommodated by these teachings to yield a highly leveragable and a readily scalable approach to providing instantaneous operating power to one or more remote peripheral devices in a movable barrier operator system. These approaches permit selective accommodation of both operating security and readiness on the one hand and economical and reliable operation on the other hand.

Figure 1:
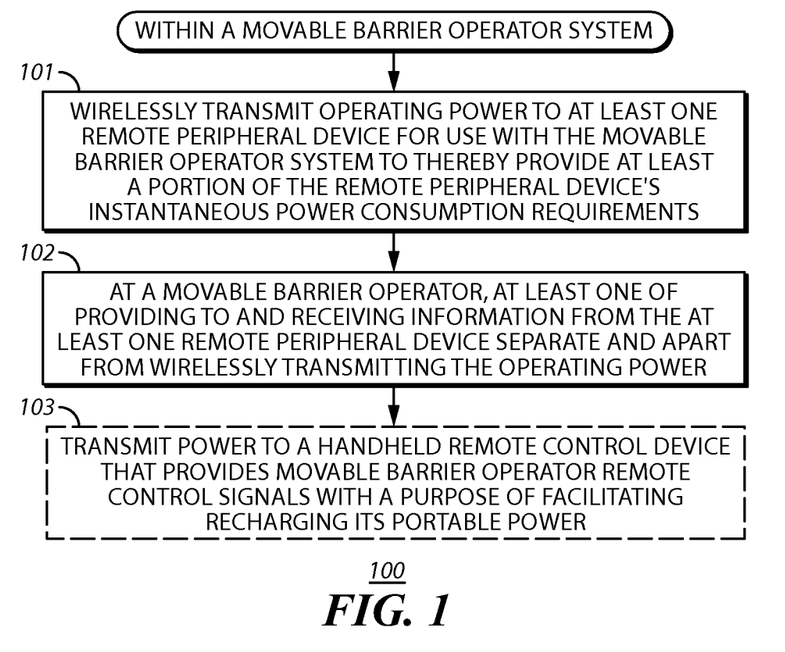
FIG. 1 comprises a flow diagram as configured in accordance with various embodiments of the invention.
Figure 2:
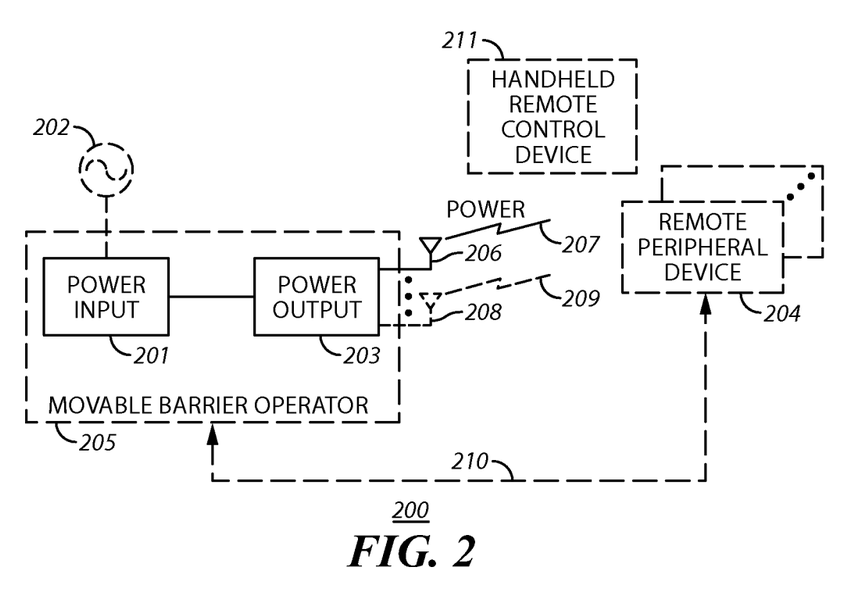
FIG. 2 comprises a block diagram as configured in accordance with various embodiments of the invention.

These and other benefits may become clearer upon making a thorough review and study of the following detailed description. Referring now to the drawings, and in particular to FIGS. 1 and 2, a process 100 suitable for use within a movable barrier operator system 200 can provide for wirelessly transmitting 101 operating power to at least one remote peripheral device (for use with that movable barrier operator system) to thereby provide at least a portion of the remote peripheral device's instantaneous power consumption requirements. This means that at least a portion of the wirelessly transmitted operating power is essentially used immediately upon receipt and is not first placed within a long term storage medium such as a battery. Although these teachings will accommodate the diversion of some portion of such a power transmission to long term storage if desired, at least a portion of this power is for immediate use by the remote peripheral device.

By one approach, this can comprise provision of a power input 201 (to facilitate operable coupling to a source of power 202 such as a source of alternating current power as tends to be ubiquitously available in residences, retail establishments, commercial and industrial facilities, and the like) and a power output 203 that operably couples to the power input 201 and that is configured and arranged to effect the above-described wireless operating power transmission to one or more corresponding remote peripheral devices 204. By one approach this power input 201 and power output 203 can comprise an integral part of a movable barrier operator 205 as comprises a part of the movable barrier operator system 200 (and with which the remote peripheral devices 204 interact in ordinary course). Or, if desired, these components can be separate and distinct from the movable barrier operator as may better suit the needs of some application settings.

Those skilled in the art will know and recognize that there are various ways to so provide for the power input 201 and the power output 203 and that other approaches and technologies are likely to be developed and to become available going forward. As the present teachings are not overly sensitive to the selection of any particular approach in this regard, for the sake of brevity further elaboration regarding such components will not be provided here except where appropriate to the description being provided.

Those skilled in the art will also know and recognize that there are various remote peripheral devices that may serve as described. Some relevant examples would likely include, but are not limited to, a movable barrier operator user control interface (such as a wall-mounted switch, a keyless entry keypad, a biometric entry interface, or the like), an obstacle detector (including but not limited to infrared beam-based detectors, contact-based detectors, and so forth), a user proximity detector, and so forth. These teachings are readily applied in a setting where there are a plurality of such remote peripheral devices 204 that include, as appropriate, a mix of peripherals to accommodate various features and/or system requirements. As but one illustrative and non-limiting example in this regard, the described remote peripheral devices 204 could include at least one movable barrier operator user control interface and at least one obstacle detector.

To effect such a transmission, the power output 203 will typically comprise at least one transmission antenna 206 that serves to radiate the aforementioned power, typically via use of a first bearer frequency. For many application settings this first bearer frequency can comprise an Industrial, Scientific, and Medical (ISM) band frequency with 902-928 MHz comprising one such band in the United States as per the dictates of the Federal Communications Commission. Other frequencies and frequency bands can of course be utilized as and where appropriate, but for many application settings the ISM band provides a number of benefits. As one example, use of such an ISM band in the United States is largely without licensing requirements.

Figure 3:
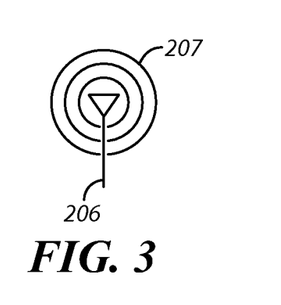
FIG. 3 comprises a block diagram schematic view as configured in accordance with various embodiments of the invention.
Figure 4:
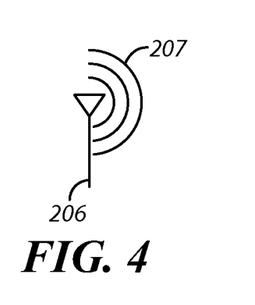
FIG. 4 comprises a block diagram schematic view as configured in accordance with various embodiments of the invention.

Such a transmission antenna 206 can comprise, by one approach and referring momentarily to FIG. 3, an omni-directional antenna. So configured, power 207 will be radiated from the antenna 206 in roughly equal proportions in all directions. By another approach and referring now momentarily to FIG. 4, this transmission antenna 206 can comprise instead a directional transmission antenna. A directional antenna, as is known in the art, will tend to radiate its energy 207 with an emphasis in at least one lobe or direction of radiation. Such directionality, in turn, can be used to direct a greater proportion of power towards one or more remote peripheral devices than would otherwise occur when using an omni-directional approach.

Figure 5:
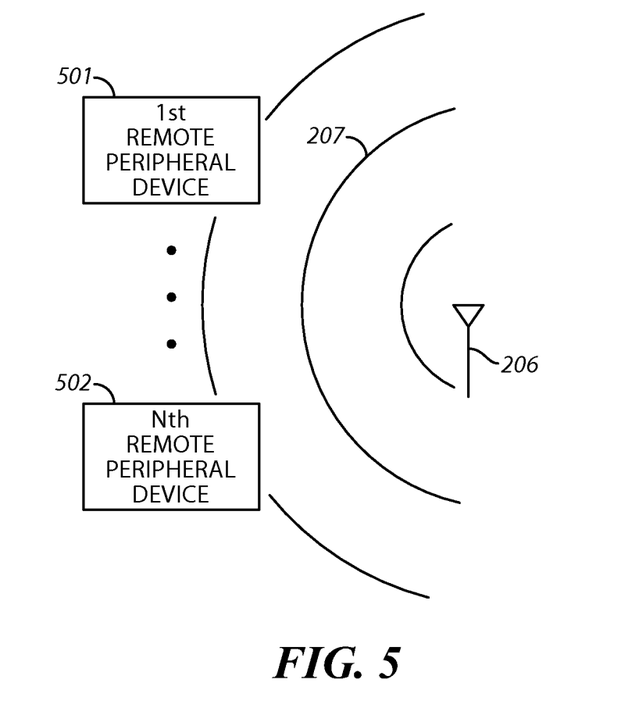
FIG. 5 comprises a block diagram schematic view as configured in accordance with various embodiments of the invention.

To illustrate, and referring now momentarily to FIG. 5, such a directional antenna 206 can be configured and arranged to direct its radiated energy towards one or more given remote peripheral devices (illustrated here by a first remote peripheral device 501 through an Nth remote peripheral device 502, where "N" will be understood to comprise an integer greater than one). Depending upon the tightness of the directionality, by one approach, this can effectively comprise directing a substantial portion of the radiated energy 207 towards these remote peripheral devices. With momentary reference now to FIG. 6, this can even comprise configuring and arranging the directional transmission antenna 206 to direct a majority portion of its radiated energy towards, for example, a given one such remote peripheral device such as the first remote peripheral device 501 depicted.

As noted above, the power output 203 can make use of more than one such transmission antenna. In such a case, and when at least two of the transmission antennas comprise directional transmission antennas, if desired each such directional transmission antenna can be configured and arranged to direct at least a substantial portion (or even a majority portion) of its energy towards a corresponding remote peripheral device(s). With continued momentary reference to FIG. 6, and as an illustrative example in this regard, a first such directional transmission antenna 206 could be configured and arranged to direct a majority of its radiated power 207 towards a first remote peripheral device 501 while a second such directional transmission antenna 208 is configured and arranged to direct a majority of its radiated power 209 towards a second remote peripheral device 601.

Figure 6:
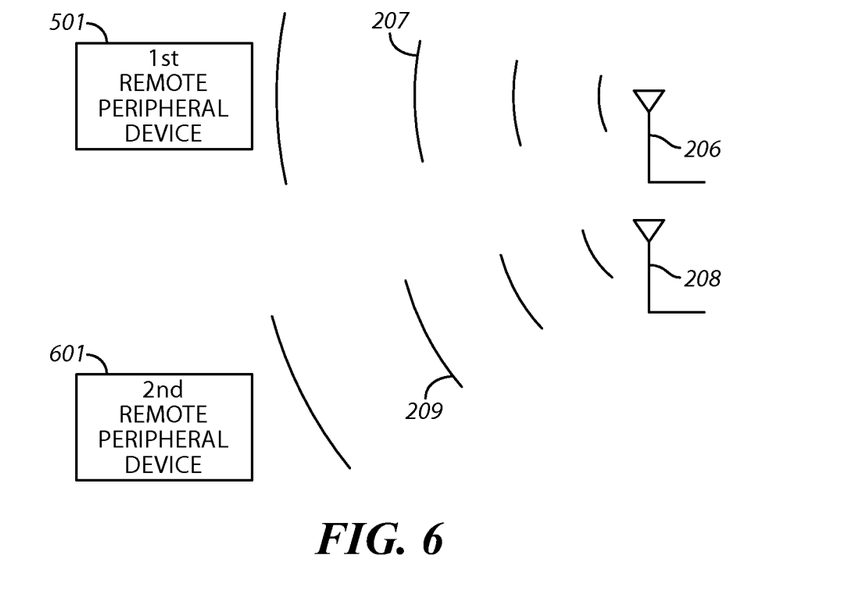
FIG. 6 comprises a block diagram schematic view as configured in accordance with various embodiments of the invention.

So configured, the first directional transmission antenna 206 can serve to wirelessly transmit operating power 207 to the first remote peripheral device 501 to thereby provide at least a portion of the latter's instantaneous power consumption requirements while the second directional transmission antenna 208 can serve to wirelessly transmit operating power 209 to the second remote peripheral device 601 to thereby provide at least a portion of the latter's instantaneous power consumption requirements.

Those skilled in the art will recognize and understand that there are a variety of ways by which an antenna can be rendered a directional transmission antenna. In some cases, for example, mechanical means (such as reflectors, deflectors, or the like) can be employed for such a purpose. As another example, if desired, electro/magnetic approaches can serve to effect the desired beam shaping and steering. As the present teachings are not particularly sensitive to the selection of any particular approach in this regard, for the sake of brevity further elaboration regarding such approaches will not be provided here.

Figure 7:
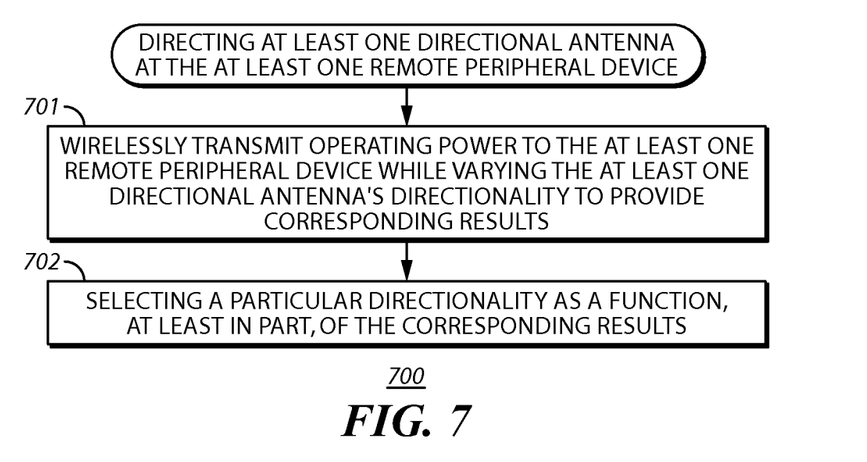
FIG. 7 comprises a flow diagram as configured in accordance with various embodiments of the invention.

When using one or more directional transmission antennas, these teachings will also accommodate appropriately steering the antenna to effect directing the radiated power in a desired direction towards a desired target. To illustrate by example, and referring momentarily to FIG. 7, a corresponding process 700 can provide for directing at least one such directional antenna towards at least one remote peripheral device by wirelessly transmitting 701 operating power to the at least one remote peripheral device while varying the antenna's directionality to thereby provide corresponding results (i.e., corresponding power reception results). This process 700 will then provide for selecting 702 a particular directionality as a function, at least in part, of those corresponding results. For example, when those results comprise information regarding strength of the received signal at various settings for the antenna, that information can serve to identify the particular directional setting for the antenna that yields a good, or even a maximum, received signal.

Figure 8:
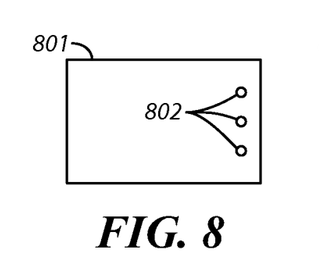
FIG. 8 comprises a block diagram schematic view as configured in accordance with various embodiments of the invention.
Figure 9:
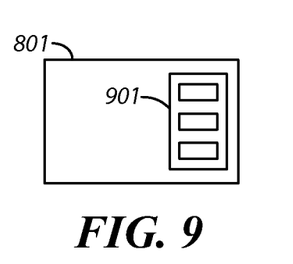
FIG. 9 comprises a block diagram schematic view as configured in accordance with various embodiments of the invention.
Figure 10:
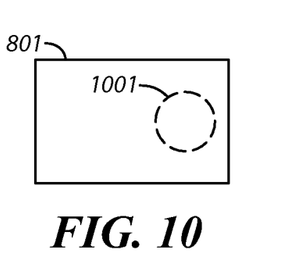
FIG. 10 comprises a block diagram schematic view as configured in accordance with various embodiments of the invention.

Test equipment can of course be employed for this purpose. It would also be possible, however, to use the remote peripheral device(s) and/or the movable barrier operator themselves as test/calibration platforms to effect such an approach. For example, the remote peripheral device(s) and/or the movable barrier operator can be configured and arranged to render the aforementioned corresponding results ascertainable by a user. With momentary reference to FIGS. 8, 9, and 10, this can comprise rendering such results ascertainable at the platform 801 in question via, for example, a display (such as a series of light emitting diodes 802 or a liquid crystal display 901) and/or an audio transducer 1001 of choice. So configured, an installer can exercise the directionality of a given antenna while noting the resultant received signal strength and thereby readily identify a useful directionality setting for that antenna with respect to that particular platform 801.

Referring again to FIGS. 1 and 2, this transmission 101 of power to one or more remote peripheral devices 204 can also accommodate using selectively variable levels of power transmission. For example, the above-described step of wirelessly transmitting operating power can itself comprise determining (including but not limited to automatically determining) when to use a first level of power transmission (such as half a watt, one watt, three watts, or the like) and when to use a second (or Nth) level of power transmission (such as a higher level of power transmission such as six watts, ten watts, or the like). Such a determination can be based, in turn, upon any criteria of interest and/or availability in a given application setting.

For example, by one approach, such a determination can be based, at least in part, upon an operating state of a movable barrier as is controlled by the aforementioned movable barrier operator. In such a case, for example, transmitted power as is applied to an obstacle detector may be shifted from a relatively low quiescent (or even a nil) operating level to a higher fully operational level upon determining that the movable barrier is (or is about to be) moving. Similarly, such transmitted power may be shifted to a lower level (or even off) when the movable barrier is no longer moving.

As another example, by one approach, such a determination can be based, at least in part, upon a power request that has been transmitted by one or more of the remote peripheral devices. In such a case, the remote peripheral device can itself be imbued with a capability of ascertaining a need for increased power and the ability to signal that need.

As yet another example, by yet another approach, such a determination can be based, at least in part, upon an operating state of one or more of the remote peripheral devices. This operating state can comprise, for example, a recent operating state, a present operating state, or even a desired operating state of the remote peripheral device.

By one approach, such selectively variable levels of transmitted power can be effected using only a single antenna. In such a case, varying amounts of transmission power can be selectively applied to the antenna to achieve the desired result. By another approach, multiple antennas can be used with each antenna serving to transmit at a given corresponding level of power (or, if desired, a given corresponding range of power transmission levels). To illustrate, a first given antenna could be configured and arranged to broadcast using a three watt power signal while a second given antenna is configured and arranged to broadcast using a six watt power signal (using either a same, or a different, bearer carrier frequency as the first given antenna as desired).

By one approach, the above-described power output 203 can make this determination regarding power levels. To facilitate such an approach, the power output 203 can itself comprise a partially or fully programmable platform that can be readily configured and arranged (via, for example, corresponding programming) to facilitate such determinations in an automated manner. Various methods, techniques, and architectural choices are available in this regard as will be well understood by those skilled in the art.

As described, one or more bearer frequencies serve to convey instantaneous power to one or more remote peripheral devices. It would also be possible to modulate such frequencies to provide some amount of informational content if desired. In general, however, these teachings will also accommodate, at the aforementioned movable barrier operator, providing to and/or receiving 102 information from such remote peripheral devices separate and apart from the step of wirelessly transmitting 101 the operating power. As suggested in FIG. 2, this can comprise use of an alternative bearer channel 210. This alternative bearer channel 210 can comprise a wired approach (such as an electrical or optical carrier of choice) but, for many application settings, will more likely itself comprise a wireless channel (such as a wireless microphone channel, a Bluetooth channel, or the like as is known in the art). In such a case, the bearer frequency used as the alternative bearer channel 210 will be different from the bearer frequency that serves to convey the operating power.

As noted above, the power wirelessly transmitted as per these teachings serves, at least in part, to provide instantaneous power requirements of the receiving platforms and not as a means of charging portable power supplies. If desired, however, in addition to serving this purpose, these teachings will also accommodate transmitting 103 power to serve a given remote peripheral device's power recharging requirements. Such an approach may be useful, for example, when used in conjunction with a handheld remote control device 211 that is itself configured and arranged to provide movable barrier operator remote control signals. By such an approach, such a handheld remote control device 211 can have its portable power supply recharged when capable of receiving the aforementioned wireless power transmissions.

Figure 11:
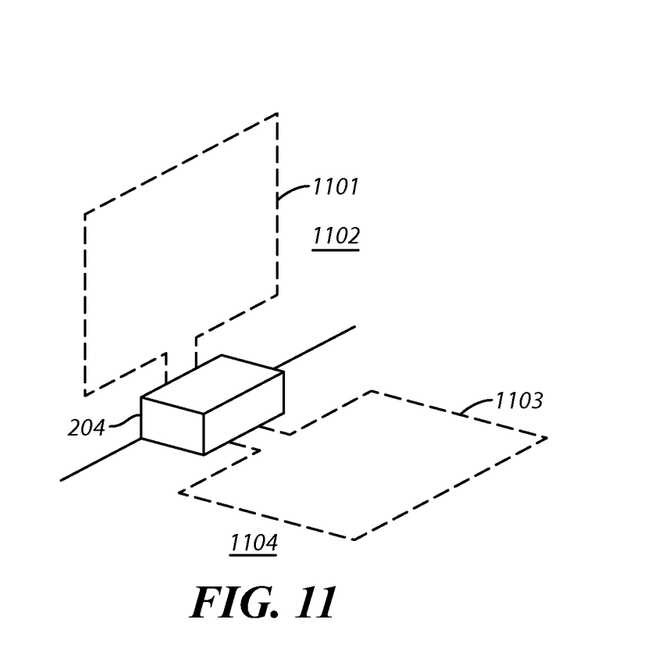
FIG. 11 comprises a perspective block diagram schematic view as configured in accordance with various embodiments of the invention.

The remote peripheral devices 204 will, in turn, tend to benefit through use of antennas that receive and effectively capture, with as little loss as possible, the aforementioned wireless power transmissions. Various such antennas are known in the art and may be applied as appropriate in conjunction with these teachings. It would also be possible, as shown in FIG. 11, to provide such a remote peripheral device 204 with one or more external antennas 1101 and 1103 that are configured and arranged to compatibly receive such operating power.

By one approach, such external antennas can comprise an electrically conductive receiver element that is supported, at least in part, by an electrically non-conductive material 1101 or 1103 such as plastic or the like. Such material can, in turn and if desired, be deployed with an adhesive material to facilitate mounting the external antenna to a selected surface during installation. This can comprise, for example, mounting such an external antenna 1102 to a wall 1102 and/or mounting such an external antenna 1103 to the floor 1104 to thereby facilitate installation in a manner that tends to ensure a relatively stable deployment configuration for the antenna.

Those skilled in the art recognize and appreciate that these teachings provide for a variety of approaches that permit useful leveraging of wireless power transmission practices in the field of movable barrier operator systems. These teachings provide relatively economical and field-friendly solutions that permit, in turn, a partial or complete avoidance of many wired application requirements as tend to presently be compulsory.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one illustrative example in this regard, and referring again to FIG. 2, these teachings will readily accommodate using more than one bearer frequency to transmit power to one or more given remote peripheral devices. For example, when using two antennas 206 and 208, the first antenna 206 can transmit power using a first bearer frequency and the second antenna 208 can transmit power using a second bearer frequency that is different from the first bearer frequency.

I claim:

1. A method comprising:
    within a movable barrier operator system:
        wirelessly transmitting operating power at a first level of power transmission to at least one remote peripheral device for use with the movable barrier operator system to thereby provide at least a portion of the remote peripheral device's instantaneous power consumption requirements;
        at a movable barrier operator, at least one of providing to and receiving information from the at least one remote peripheral device separate and apart from wirelessly transmitting the operating power; and
        wirelessly transmitting operating power at a second level of power transmission that is different than the first level of power transmission to the at least one remote peripheral device based at least in part on at least one of:
            information received from at least one remote peripheral device; or
            an operating state of a movable barrier as is controlled by the movable barrier operator.

2. The method of claim 1 further comprising transmitting power to a handheld remote control device that is configured and arranged to provide movable barrier operator remote control signals with a purpose of facilitating recharging of a portable power supply as corresponds to the handheld remote control device.

3. The method of claim 1 wherein the at least one remote peripheral device comprises at least one of:
    a movable barrier operator user control interface;
    an obstacle detector.

4. The method of claim 3 wherein wirelessly transmitting operating power to at least one remote peripheral device comprises wirelessly transmitting operating power to a plurality of remote peripheral devices.

5. The method of claim 4 wherein the plurality of remote peripheral devices comprise, at least in part, at least one movable barrier operator user control interface and an obstacle detector.

6. The method of claim 1 wherein wirelessly transmitting operating power to at least one remote peripheral device to thereby provide at least a portion of the remote peripheral device's instantaneous power consumption requirements further comprises wirelessly transmitting operating power to at least one remote peripheral device to thereby:
    provide at least a portion of the remote peripheral device's instantaneous power consumption requirements; and
    provide at least a portion of the remote peripheral device's power recharging requirements.

7. The method of claim 1 wherein wirelessly transmitting operating power to at least one remote peripheral device comprises, at least in part, determining when to use a first level of power transmission and when to use at least a second level of power transmission that is different from the first level of power transmission.

8. The method of claim 7 wherein determining when to use a first level of power transmission and when to use at least a second level of power transmission that is different from the first level of power transmission comprises, at least in part, determining when to use a first level of power transmission and when to use at least a second level of power transmission that is different from the first level of power transmission as a function, at least in part, of an operating state of a movable barrier as is controlled by the movable barrier operator.

9. The method of claim 7 wherein determining when to use a first level of power transmission and when to use at least a second level of power transmission that is different from the first level of power transmission comprises, at least in part, determining when to use a first level of power transmission and when to use at least a second level of power transmission that is different from the first level of power transmission as a function, at least in part, of a power request transmitted from the at least one remote peripheral device.

10. The method of claim 7 wherein determining when to use a first level of power transmission and when to use at least a second level of power transmission that is different from the first level of power transmission comprises, at least in part, determining when to use a first level of power transmission and when to use at least a second level of power transmission that is different from the first level of power transmission as a function, at least in part, of an operating state of at least one remote peripheral device.

11. The method of claim 10 wherein the at least one remote peripheral device comprises the remote peripheral device.

12. The method of claim 7 wherein determining when to use a first level of power transmission and when to use at least a second level of power transmission that is different from the first level of power transmission comprises, at least in part, automatically determining when to use a first level of power transmission and when to use at least a second level of power transmission that is different from the first level of power transmission.

13. The method of claim 12 wherein automatically determining when to use a first level of power transmission and when to use at least a second level of power transmission that is different from the first level of power transmission comprises, at least in part, automatically determining when to use a first level of power transmission and when to use at least a second level of power transmission that is different from the first level of power transmission as a function, at least in part, of a desired operating state of the at least one remote peripheral device.

14. The method of claim 1 wherein:
wirelessly transmitting operating power to at least one remote peripheral device to thereby provide at least a portion of the remote peripheral device's instantaneous power consumption requirements comprises wireless transmitting the operating power using a first bearer frequency; and
at least one of providing to and receiving information from the at least one remote peripheral device separate and apart from wirelessly transmitting the operating power comprises at least one of providing to and receiving the information using a second bearer frequency that is different than the first bearer frequency.

15. The method of claim 14 wherein the first bearer frequency comprises an Industrial, Scientific, and Medical (ISM) band frequency.

16. The method of claim 15 wherein the second bearer frequency does not comprise an ISM band frequency.

17. The method of claim 1 wherein wirelessly transmitting operating power to at least one remote peripheral device comprises wirelessly transmitting operating power to at least one remote peripheral device using only a single transmission antenna.

18. The method of claim 17 wherein using only a single transmission antenna comprises using an omni-directional transmission antenna.

19. The method of claim 17 wherein using only a single transmission antenna comprises using a directional transmission antenna.

20. The method of claim 19 wherein wirelessly transmitting operating power to at least one remote peripheral device further comprises configuring and arranging the directional transmission antenna to direct its radiated energy towards the at least one remote peripheral device.

21. The method of claim 20 wherein configuring and arranging the directional transmission antenna to direct its radiated energy towards the at least one remote peripheral device comprises configuring and arranging the directional transmission antenna to direct a substantial portion of its radiated energy towards the at least one remote peripheral device.

22. The method of claim 21 wherein configuring and arranging the directional transmission antenna to direct a substantial portion of its radiated energy towards the at least one remote peripheral device comprises, at least in part, configuring and arranging the directional transmission antenna to direct a substantial portion of its radiated energy towards a plurality of the remote peripheral devices.

23. The method of claim 21 wherein configuring and arranging the directional transmission antenna to direct a substantial portion of its radiated energy towards the at least one remote peripheral device further comprises configuring and arranging the directional transmission antenna to direct a majority portion of its radiated energy towards the at least one remote peripheral device.

24. The method of claim 1 wherein wirelessly transmitting operating power to at least one remote peripheral device comprises wirelessly transmitting operating power to at least one remote peripheral device using a plurality of transmission antennas.

25. The method of claim 24 wherein wirelessly transmitting operating power to at least one remote peripheral device using a plurality of transmission antennas comprises wirelessly transmitting operating power using a first bearer frequency with a first one of the plurality of transmission antennas and wirelessly transmitting operating power using a second bearer frequency, which second bearer frequency is different from the first bearer frequency, with a second one of the plurality of transmission antennas, which second one of the plurality of transmission antennas is different from the first one of the plurality of transmission antennas.

26. The method of claim 24 wherein using a plurality of transmission antennas comprises using at least one directional transmission antenna.

27. The method of claim 26 wherein using at least one directional transmission antenna comprises using a plurality of directional transmission antennas.

28. The method of claim 27 wherein using a plurality of directional transmission antennas further comprises, at least in part:
wirelessly transmitting operating power to at least a first remote peripheral device to thereby provide at least a portion of the first remote peripheral device's instantaneous power consumption requirements using a first one of the plurality of directional transmission antennas;
wirelessly transmitting operating power to at least a second remote peripheral device, which second remote peripheral device is different from the first remote peripheral device, to thereby provide at least a portion of the second remote peripheral device's instantaneous power consumption requirements using a second one of the plurality of directional transmission antennas, which second one of the plurality of directional transmission antennas is different from the first one of the plurality of directional transmission antennas.

29. The method of claim 26 further comprising:
directing the at least one directional transmission antenna at the at least one remote peripheral device.

30. The method of claim 29 wherein directing the at least one directional transmission antenna at the at least one remote peripheral device comprises, at least in part:
wirelessly transmitting operating power to at least one remote peripheral device while varying the at least one directional transmission antenna's directionality to provide corresponding results;
selecting a particular directionality as a function, at least in part, of the corresponding results.

31. The method of claim 30 wherein providing corresponding results comprises, at least in part, rendering the corresponding results ascertainable via the at least one remote peripheral device.

32. The method of claim 31 wherein rendering the corresponding results ascertainable via the at least one remote peripheral device comprises, at least in part, rendering the corresponding results visually ascertainable via a display.

33. The method of claim 31 wherein rendering the corresponding results ascertainable via the at least one remote peripheral device comprises, at least in part, rendering the corresponding results audibly ascertainable via an audio transducer.

34. The method of claim 30 wherein providing corresponding results comprises, at least in part, rendering the corresponding results ascertainable via the movable barrier operator.

35. The method of claim 34 wherein rendering the corresponding results ascertainable via the movable barrier operator comprises, at least in part, rendering the corresponding results visually ascertainable via a display.

36. The method of claim 31 wherein rendering the corresponding results ascertainable via the movable barrier operator comprises, at least in part, rendering the corresponding results audibly ascertainable via an audio transducer.

37. The method of claim 1 wherein wirelessly transmitting operating power to at least one remote peripheral device comprises wirelessly transmitting operating power to at least one remote peripheral device having an external antenna configured and arranged to compatibly receive the operating power.

38. The method of claim 37 wherein the external antenna comprises, at least in part, an electrically conductive receiver element that is supported, at least in part, by an electrically nonconductive material.

39. The method of claim 38 wherein the electrically nonconductive material comprises, at least in part, an adhesive material to facilitate mounting the external antenna to a selected surface during installation.

40. An apparatus comprising:
a power input to facilitate operable coupling to a source of power;
a power output operably coupled to the power input and being configured and arranged to wirelessly transmit operating power at a first level of power transmission to at least one remote peripheral device for use with a movable barrier operator system, separate and apart from any wireless transmission of information between a movable barrier operator and the remote peripheral device, to thereby provide at least a portion of the remote peripheral device's instantaneous power consumption requirements, the power output further configured and arranged to wirelessly transmit operating power at a second level of power transmission that is different than the first level of power transmission to at least one remote peripheral device based at least in part on at least one of:
information received from at least one remote peripheral device; or
an operating state of a movable barrier as is controlled by the movable barrier operator.

41. The apparatus of claim 40 wherein the at least one remote peripheral device comprises at least one of:
a movable barrier operator user control interface;
an obstacle detector.

42. The apparatus of claim 40 wherein the power output is further configured and arranged to wirelessly transmit operating power to a plurality of the remote peripheral devices.

43. The apparatus of claim 40 wherein the power output is further configured and arranged to wirelessly transmit operating power to at least one remote peripheral device to thereby provide at least a portion of the remote peripheral device's instantaneous power consumption requirements further comprises wirelessly transmitting operating power to at least one remote peripheral device to thereby:
provide at least a portion of the remote peripheral device's instantaneous power consumption requirements; and
provide at least a portion of the remote peripheral device's power recharging requirements.

44. The apparatus of claim 40 wherein the power output is further configured and arranged to wirelessly transmit operating power to at least one remote peripheral device by, at least in part, determining when to use a first level of power transmission and when to use at least a second level of power transmission that is different from the first level of power transmission.

45. The apparatus of claim 44 wherein the power output is further configured and arranged to determine when to use a first level of power transmission and when to use at least a second level of power transmission that is different from the first level of power transmission by, at least in part, determining when to use a first level of power transmission and when to use at least a second level of power transmission that is different from the first level of power transmission as a function, at least in part, of an operating state of a movable barrier as is controlled by the movable barrier operator.

46. The apparatus of claim 44 wherein the power output is further configured and arranged to determine when to use a first level of power transmission and when to use at least a second level of power transmission that is different from the first level of power transmission by, at least in part, determining when to use a first level of power transmission and when to use at least a second level of power transmission that is different from the first level of power transmission as a function, at least in part, of a power request transmitted from the at least one remote peripheral device.

47. The apparatus of claim 44 wherein the power output is further configured and arranged to determine when to use a first level of power transmission and when to use at least a second level of power transmission that is different from the first level of power transmission by, at least in part, determining when to use a first level of power transmission and when to use at least a second level of power transmission that is different from the first level of power transmission as a function, at least in part, of an operating state of at least one remote peripheral device.

48. The apparatus of claim 40 wherein the power output is further configured and arranged to wirelessly transmit operating power to at least one remote peripheral device to thereby provide at least a portion of the remote peripheral device's instantaneous power consumption requirements comprises wireless transmitting the operating power using a first bearer frequency.

49. The apparatus of claim 48 wherein the first bearer frequency comprises an Industrial, Scientific, and Medical (ISM) band frequency.

50. The apparatus of claim 40 wherein the power output is further configured and arranged to wirelessly transmit operating power to at least one remote peripheral device by wirelessly transmitting operating power to at least one remote peripheral device using only a single transmission antenna.

51. The apparatus of claim 50 wherein the single transmission antenna comprises an omnidirectional transmission antenna.

52. The apparatus of claim 50 wherein the single transmission antenna comprises a directional transmission antenna.

53. The apparatus of claim 52 wherein the directional transmission antenna configured and arranged to direct its radiated energy towards the at least one remote peripheral device.

54. The apparatus of claim 53 wherein the directional transmission antenna is configured and arranged to direct its radiated energy towards the at least one remote peripheral device by configuring and arranging the directional transmission antenna to direct a substantial portion of its radiated energy towards the at least one remote peripheral device.

55. The apparatus of claim 54 wherein the directional transmission antenna is configured and arranged to direct a substantial portion of its radiated energy towards the at least one remote peripheral device by, at least in part, configuring and arranging the directional transmission antenna to direct a substantial portion of its radiated energy towards a plurality of the remote peripheral devices.

56. The apparatus of claim 54 wherein the directional transmission antenna is configured and arranged to direct a substantial portion of its radiated energy towards the at least one remote peripheral device by configuring and arranging the directional transmission antenna to direct a majority portion of its radiated energy towards the at least one remote peripheral device.

57. The apparatus of claim 40 wherein the power output is further configured and arranged to wirelessly transmit operating power to at least one remote peripheral device by wirelessly transmitting operating power to at least one remote peripheral device using a plurality of transmission antennas.

58. The apparatus of claim 57 wherein the power output is further configured and arranged to wirelessly transmit operating power to at least one remote peripheral device using a plurality of transmission antennas by wirelessly transmitting operating power using a first bearer frequency with a first one of the plurality of transmission antennas and wirelessly transmitting operating power using a second bearer frequency, which second bearer frequency is different from the first bearer frequency, with a second one of the plurality of transmission antennas, which second one of the plurality of transmission antennas is different from the first one of the plurality of transmission antennas.

59. The apparatus of claim 57 wherein at least one of the transmission antennas comprises a directional transmission antenna.

60. The apparatus of claim 59 wherein the directional transmission antenna comprises a plurality of directional transmission antennas.

61. The apparatus of claim 60 wherein the power output is further configured and arranged to use a plurality of directional transmission antennas by, at least in part:

wirelessly transmitting operating power to at least a first remote peripheral device to thereby provide at least a portion of the first remote peripheral device's instantaneous power consumption requirements using a first one of the plurality of directional transmission antennas;
wirelessly transmitting operating power to at least a second remote peripheral device, which second remote peripheral device is different from the first remote peripheral device, to thereby provide at least a portion of the second remote peripheral device's instantaneous power consumption requirements using a second one of the plurality of directional transmission antennas, which second one of the plurality of directional transmission antennas is different from the first one of the plurality of directional transmission antennas.

62. An apparatus comprising:
a movable barrier operator comprising
    a power input configured to receive power from a power source;
    a power output device in electrical communication with the power input;
    at least one transmission antenna in electrical communication with the power output device, wherein the power output device and the at least one transmission antenna are configured to wirelessly transmit operating power at a first level of power transmission to at least one remote peripheral device, separate and apart from any wireless transmission of information between the movable barrier operator and the remote peripheral device, to provide at least a portion of the remote peripheral device's instantaneous power consumption requirements;
wherein the power output device and the at least one transmission antenna are further configured to wirelessly transmit operating power at a second level of power transmission that is different than the first level of power transmission to the at least one remote peripheral device based at least in part on at least one of:
    information received from at least one remote peripheral device; or
    an operating state of a movable barrier as is controlled by the movable barrier operator.

\* \* \* \* \*